May 15, 1951  H. O. PUTT  2,553,380
REVERSIBLE TURBINE TYPE FLUID COUPLING
Filed March 11, 1946  5 Sheets-Sheet 1
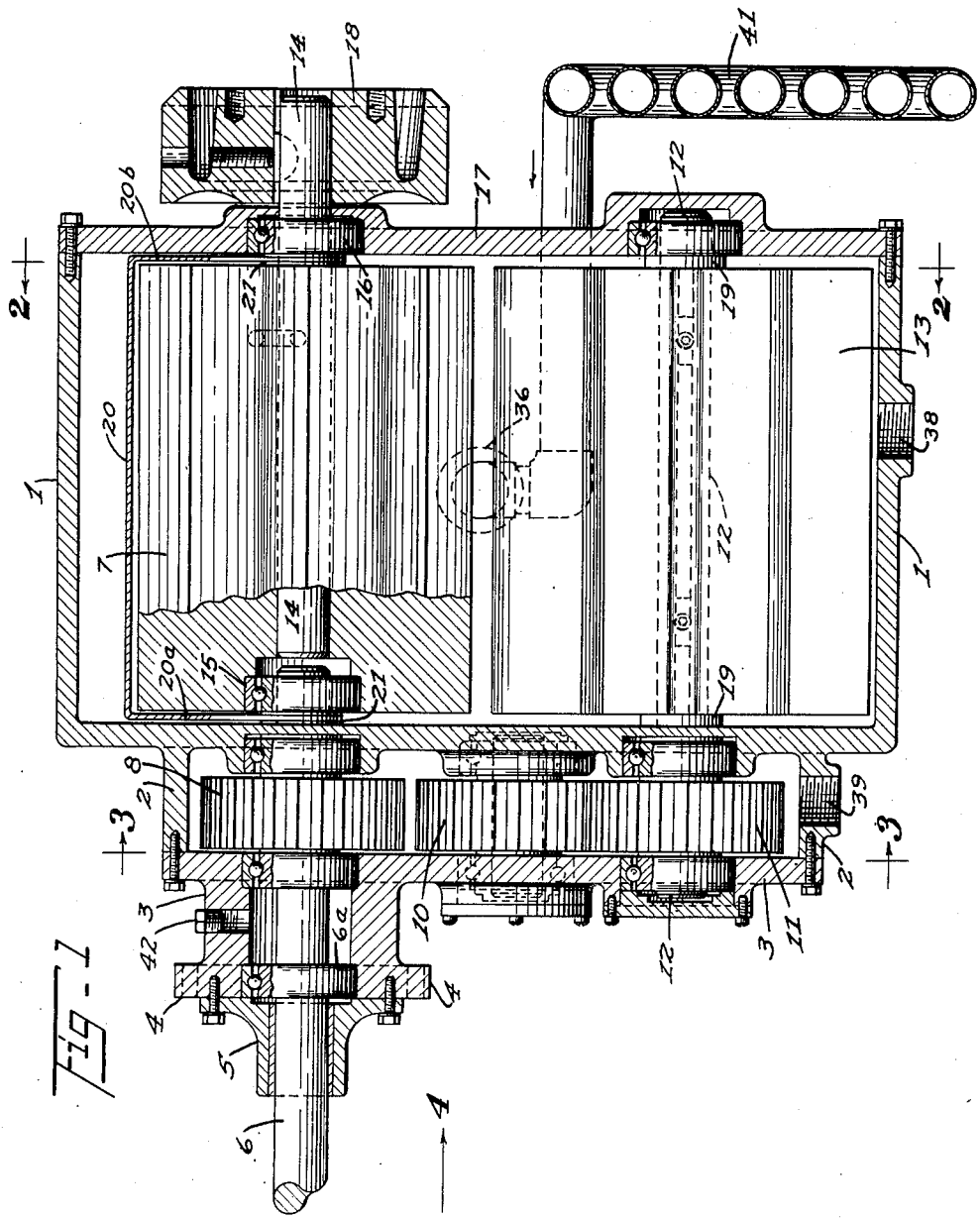
Inventor
HARLIE O. PUTT
By Lester L. Sargent
Attorney

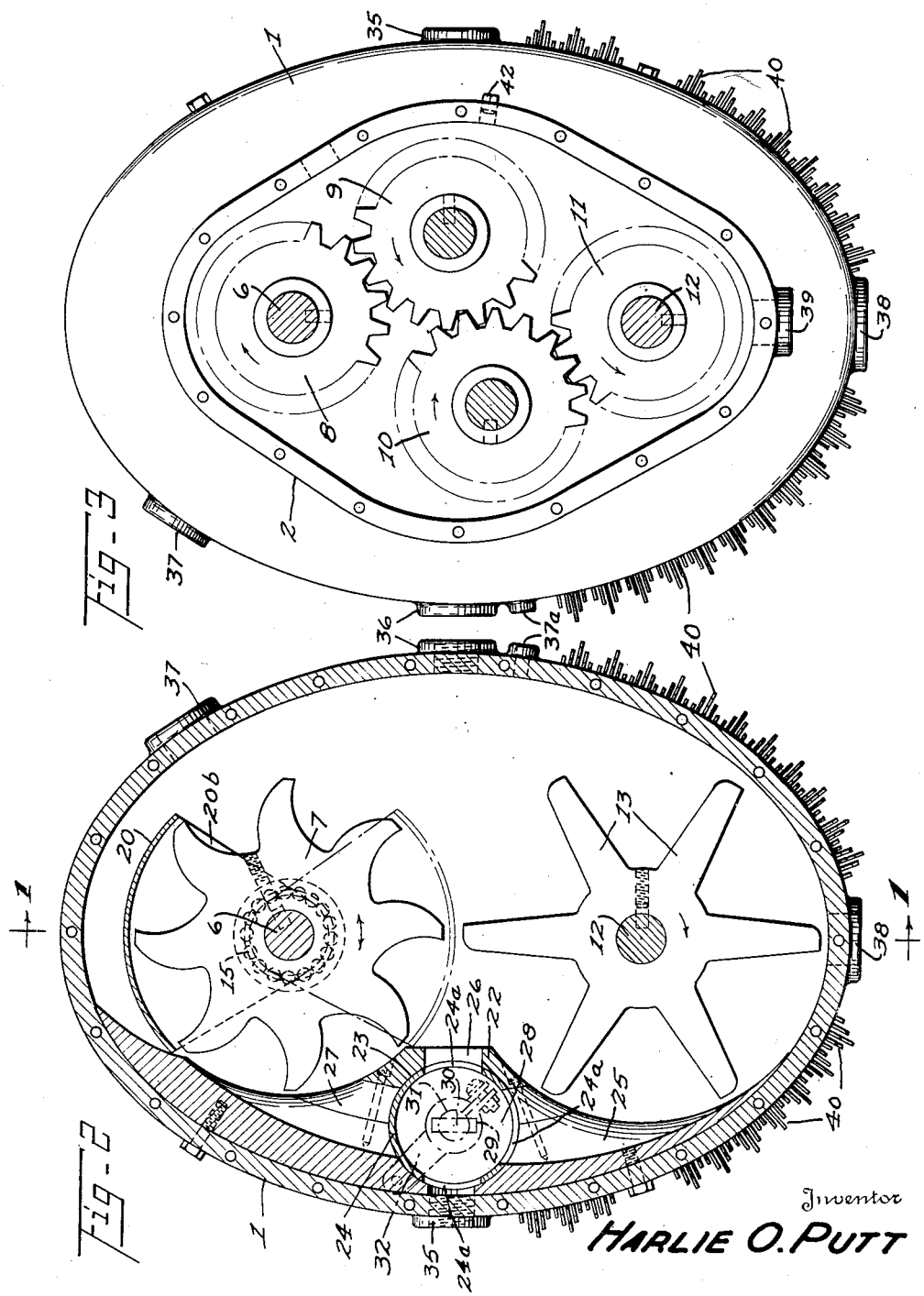

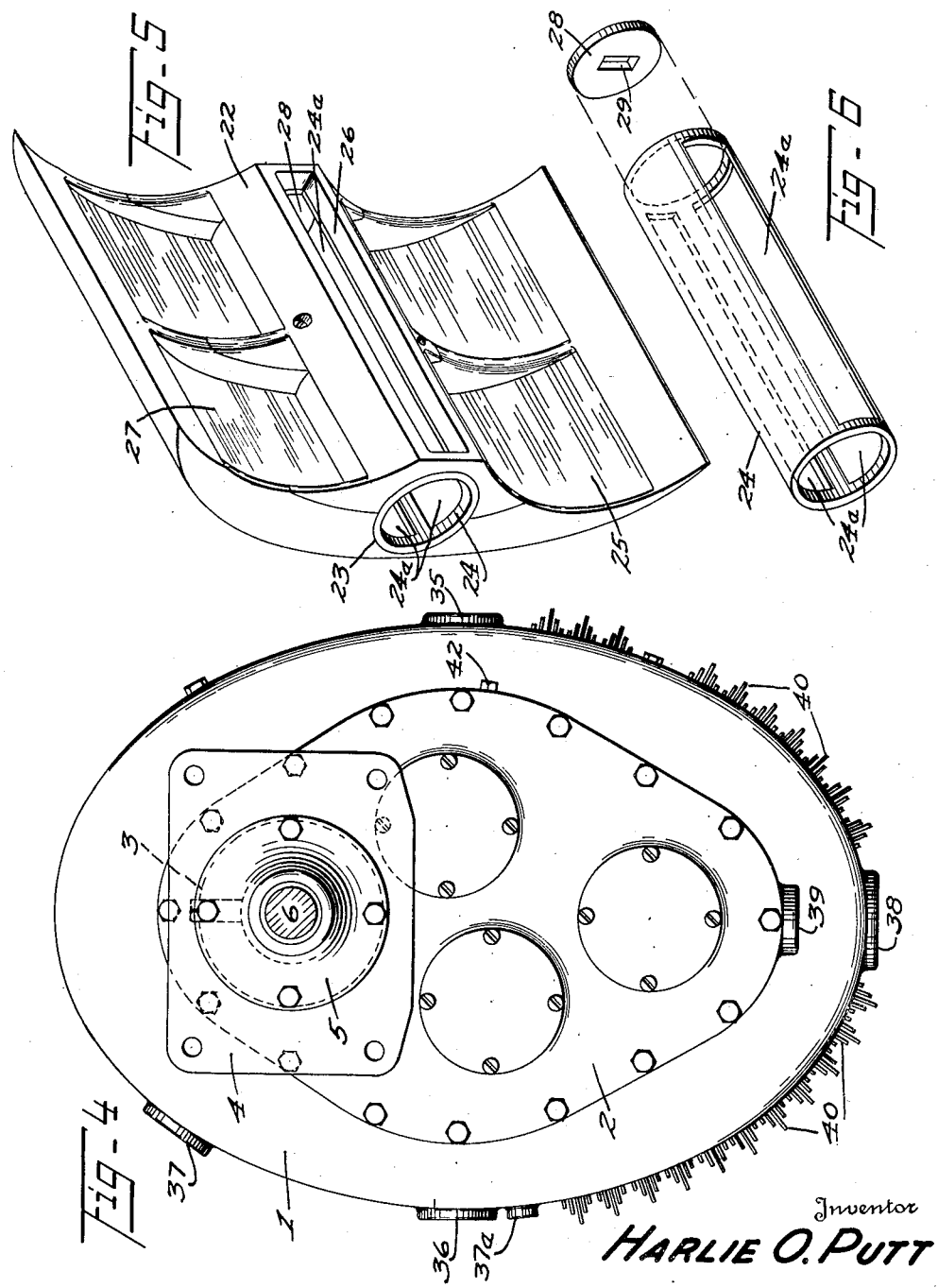

May 15, 1951 H. O. PUTT 2,553,380
REVERSIBLE TURBINE TYPE FLUID COUPLING
Filed March 11, 1946 5 Sheets-Sheet 4
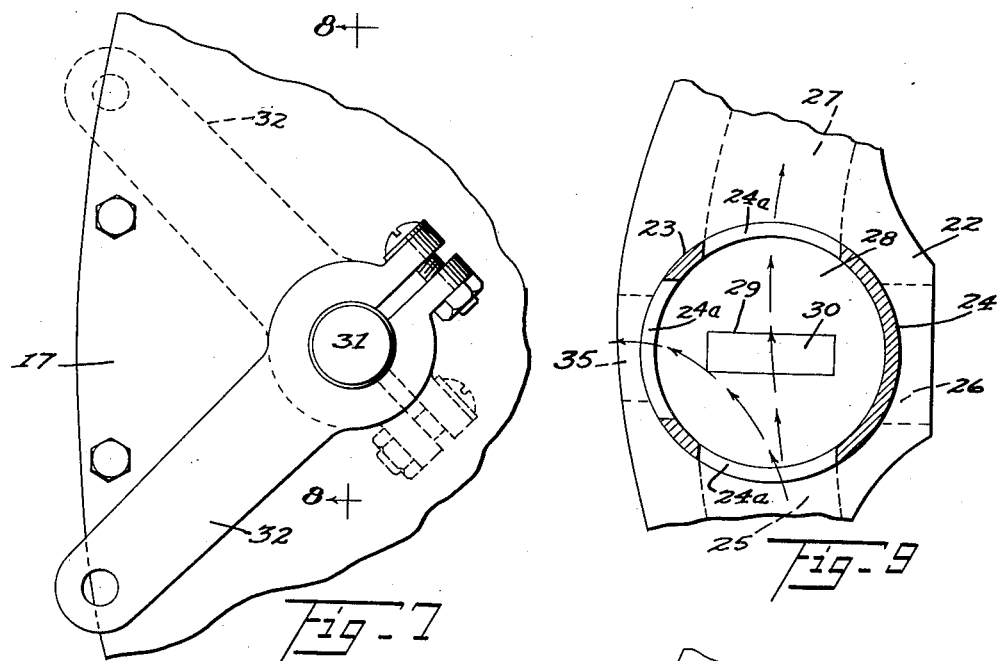
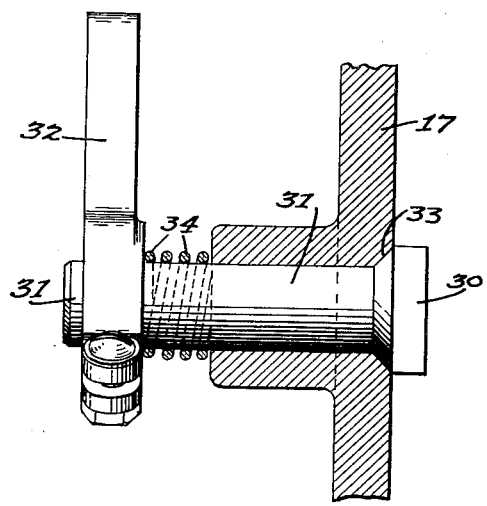
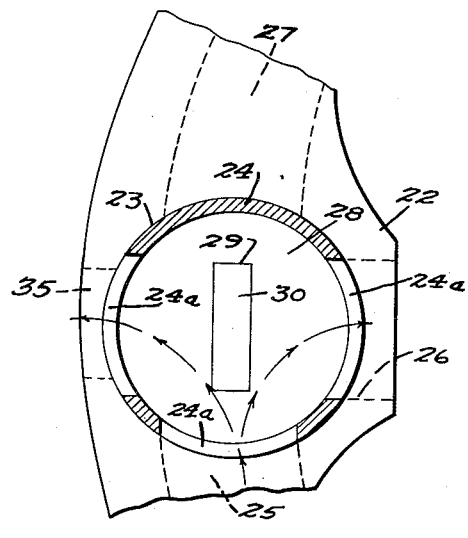
Inventor
HARLIE O. PUTT
By Lester L. Sargent
Attorney

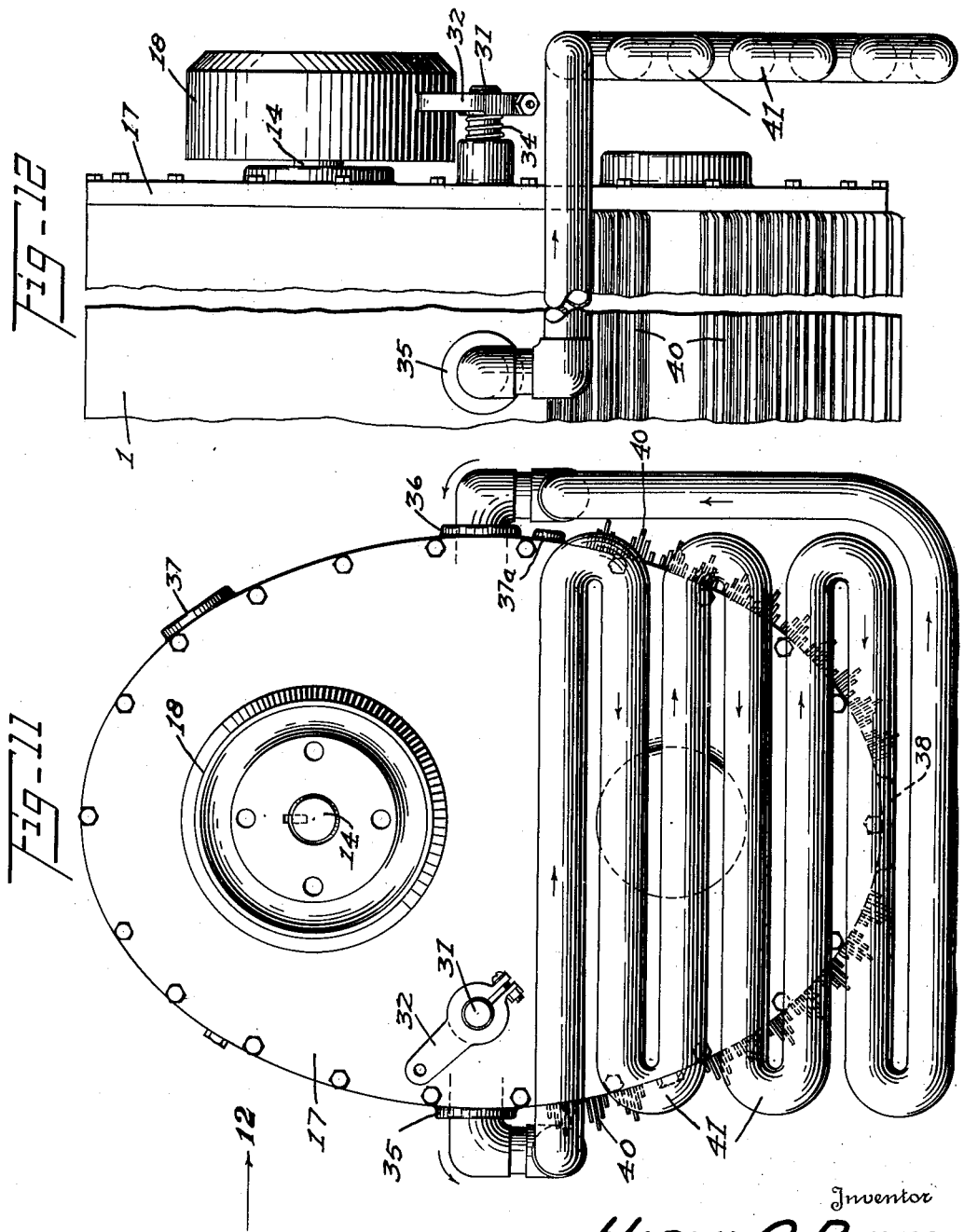

Patented May 15, 1951

2,553,380

UNITED STATES PATENT OFFICE 2,553,380

REVERSIBLE TURBINE TYPE FLUID COUPLING

Harlie O. Putt, Elkhart, Ind.

Application March 11, 1946, Serial No. 653,476

8 Claims. (Cl. 60—54)

The object of my invention is to provide a method and means of varying the driving ratios without the necessity of gear shifting.

It is also my object to provide a method and means whereby a variable speed and torque between the driving and driven hydraulic members, in either direction of rotation, will be automatically attained.

A further object is to provide a method and means of controlling the projection of a fluid against either the upper or lower "toothed" periphery of a hydraulically driven rotor to achieve either clockwise or counter-clockwise rotation of same, as hereinafter more fully described.

Another object is to provide a method and means whereby a self-operating shield or "baffle," covering a portion of the "teeth" of the driven rotor will automatically swing into proper position to prevent the neutralization or opposition of fluid action on said rotor when same is rotating in the reverse direction, as hereinafter more fully described.

And it is my object to provide a device of relatively simple and economic design and construction which may be employed on automobiles or stationary applications.

I attain these and other advantages by the structure illustrated in the accompanying drawings and herein described, in which:

Figure 1 is a view partly in elevation and partly in section of the transmission on line 1—1 of Fig. 2;

Fig. 2 is a section taken on the line 2—2 of Fig. 1, showing the driving and driven rotors in their relative positions with respect to the housing and nozzle structure;

Fig. 3 is a section on line 3—3 of Fig. 1;

Fig. 4 is a drive end elevation of the invention;

Fig. 5 is an isometric or projected view of the nozzle structure;

Fig. 6 is a projected view of the tubular valve member, showing the elongated ports of same;

Fig. 7 is a front plan view of the valve control arm, showing degree of throw;

Fig. 8 is a detail view, partly in section and partly in elevation, of the valve control arm and shaft, on line 8—8 of Fig. 7;

Fig. 9 is a detail sectional view of the tubular valve within the nozzle structure when same is in its reverse position, corresponding to the dotted line position of control arm, Fig. 7;

Fig. 10 is a similar view but with the tubular valve in its "forward" position, corresponding to the solid line position of control arm, Fig. 7;

Fig. 11 is an end elevation of a tubular radiator for the purpose of cooling the fluid which is forced through radiator or tubular coils by the action of the rotor; and Fig. 12 is a side elevation of the tubular radiator coils shown in Fig. 11.

Like numerals designate like parts in each of the several views.

Referring to the drawings, I provide an elliptically-shaped housing 1 (Fig. 1), open at one end and closed at the opposite end. On the closed end and integral with same, a housing 2 is provided for the train of gears, as shown in Figs. 1, 3 and 4. A cover 3 is provided for the gear housing and is attached thereto by means of cap-screws as shown. Provision is made for the emplacement of ball-bearings for the gear shafts in both the gear cover 3 and housing 1 as shown. Integral with the cover 3, a mounting bracket 4 (Figs. 1 and 4) is provided as shown. A "strain" bushing or bearing 5 may be provided which is attached to the bracket 4 by means of cap-screws as shown. A driving shaft 6 rotates on ball-bearings and terminates in a ball-bearing 15 emplaced within one end of the driven rotor 7 as shown, and within which it turns freely. A pinion gear 8 is rigidly keyed to this shaft 6 and transmits power through the idler gears 9 and 10 to the gear 11 which is rigidly keyed to the driving rotor shaft 12 and to which the driving rotor 13 is also rigidly keyed as shown. Thus this rotor is caused to rotate in the opposite direction to that of the shaft 6.

A shaft 14 is rigidly keyed to the driven rotor 7 which is supported by the ball-bearing 15 at its inner end and by the ball-bearing 16 at its outer end as shown. The shaft 14 extends through the end cover 17 and may be rigidly keyed to a suitable coupling or power take-off member 18.

Suitable spacing washers 19 are provided to maintain central position of driving rotor 13 as shown. A U-shaped shield or baffle 20, formed as shown in Figs. 1 and 2 is provided. The inner arm 20a of member 20 has its bearing on shaft 6, while the outer arm 20b has its bearing on shaft 14 as shown. Each arm is frictionally held between two fibre washers 21, but has a free fit on the respective shafts. A maximum friction effect against the inner fiber washers is attained by springing the respective arms inwardly toward the ends of the rotor 7 before assembly thereon. This will cause the baffle 20 to swing around with the initial turning of the driven rotor 7 to the position shown in solid lines if rotating counter-clockwise, or to the dotted line position shown if rotating clockwise, as viewed in Fig. 2.

A nozzle structure 22 is emplaced within the rotor housing 1 as shown in Fig. 2. It may be cast integral with said housing, or it may be formed separately and secured in a rigid position within said housing by means of cap-screws as shown in Figs. 2 and 5. It is accurately bored out at 23 to receive the tubular valve 24, Figs. 2, 5 and 6. Fluid channels or ports 24a are provided for intake passage 25 and outlet passages 26 and 27, as shown in Figs. 2 and 6, the latter two outlets being controlled by the tubular valve 24. This valve structure should have an easy bearing fit within the structure 22 so that it may be easily turned to the desired position. This valve structure is preferably made of a length of tubing and is provided with three elongated ports or openings in its wall, to conform with the channel openings 25, 26 and 27, of the nozzle structure, specifically as shown in Figs. 2, 5 and 6, also 9 and 10. Suitable end members 28 (Fig. 6) are securely placed within the ends of the tubular valve as shown in Fig. 6. One of these end members 28 is provided with a rectangular slot 29 (Fig. 6) which engages a tongue 30 (Fig. 8) on the inner end of the shaft 31, to the opposite end of which the control lever 32 (Figs. 7 and 8) is clamped, as shown. This shaft 31 has its bearing in the cover plate 17 as shown and is provided with a bevel seat 33 on the inner side of said plate 17, to form a liquid tight seat. This objective is attained by means of the spring 34 and also by means of the fluid pressure against the inner end area of said shaft when device is operating. The gear case is filled with the proper amount of gear lubricant through the filler plug opening 37, Figs. 3 and 4, and may be flushed out through the drain opening 39. 40 designates the cooling fins and 41 the radiator coil as shown in Figs. 11 and 12. Lubricant may also be injected through the filler-plug opening 42 shown in Fig. 1, to lubricate the strain bearing 5 and the ball-bearing 6a adjacent thereto. A filler opening 37 and a drain opening 38, Figs. 1, 2, 3 and 4, are provided in the housing 1 as shown. If it is desired to by-pass a portion of the fluid from the rotor housing through a cooling coil or similar device to reduce operating temperatures of said fluid, provision may be made for the outlet as shown, 35, and for the return as shown, 36 (Fig. 2). The housing 1 may also be "finned" around its external area if desired, to aid in the cooling effect when the device is used continuously and employing the same fluid, as would be the case with an automobile installation. However, in stationary applications, a much larger supply of fluid can be made available with greater cooling facilities or capacity so that excessive temperatures of the fluid will not develop, even under maximum time and load conditions.

With respect to Figs. 1 and 3, it will be observed that when the shaft 6 is driven by an auto engine, that the rotor 13 will be driven in the opposite direction. As viewed in Fig. 2, it will be seen that it would always rotate "clockwise" as shown. It will also be seen that the rotor 7 may rotate in either direction, depending upon whether fluid projection is against the lower toothed periphery or against its side and upper periphery. Now, if the housing 1 is say, half full of fluid, the rotation of driving rotor 13 would force fluid into the intake channel 25 and out through the nozzle opening 26 and in the same direction as the motion of the vanes of this driving rotor 13. The fluid would thereby be actuated by this motion and, in addition, any fluid remaining between the teeth or vanes of driving rotor 13 after they had passed the intake opening 25, would be thrown upwardly against the fluid coming from the nozzle 26 and thereby "bending" the entire stream upwardly and outwardly in a clockwise direction against the teeth or vanes of the lower side of the driven rotor 7. This would cause it to revolve in a counter-clockwise direction, which would conform with the direction of rotation of the auto motor or shaft 6—assuming, of course, that the valve 24 was in the position shown in Figs. 2 and 10. This motion constitutes the "forward" drive. During this direction of rotation of the rotor 7, the baffle 20 would remain in the position shown in Fig. 2, by virtue of the friction of its arms against the friction washers 21 at each end of said rotor. Now, with rotor 13 running as before (clockwise) and the control valve 24 turned just 90 degrees, as shown in Fig. 9 and indicated by the dotted line position of the lever arm 32 (Fig. 7), the nozzle opening 26 would be closed and the "reverse" channel 27 opened. This will cause fluid to be projected against the teeth of the driven rotor 7 to force its rotation in the reverse direction (clockwise), which would conform with a reverse motion of the car or device driven by this rotor 7.

As this reverse rotation of rotor 7 started and within one-half revolution of same, the baffle 20 would be swung around to the dotted line position indicated between driven rotor 7 and driving rotor 13. In this position it would prevent fluid thrown from between the vanes of driving rotor 13 from striking the teeth of driven rotor 7 on its under side, which would otherwise interfere with and oppose the fluid action from nozzle 27. Thus, any fluid remaining between the vanes of driving rotor 13 immediately after they have passed the intake opening 25 would be thrown outwardly against the smooth surface of the baffle and thence to the opposite side of the housing wall without affecting rotation of driven rotor 7 in its reverse motion.

In both positions of the control valve 24, the by-pass outlet port 35 is open, as shown in Figs. 9 and 10, so that circulation of fluid through any desired or conventional cooling device (not shown) is not affected or retarded, as will be clearly seen. Fluid projected against driven rotor 7 in either the forward or reverse rotation is thrown to the opposite side of the housing wall 1 and returns to the lower part of said housing. A "breather" vent may be provided in the filler plug at 37 or may be placed at any desired point near the upper part of the housing.

Any suitable fluid having sufficient lubricating qualities may be employed. The device may be constructed and fitted with canvas-Bakelite journal bearings and water used as the actuating fluid. The nozzle structure 22 may be constructed in two parts and held firmly together by screws as shown or welded and the assembly then bolted in place inside the housing 1 as shown and the valve bore 23 finished square with the face of the housing. Or this nozzle structure may be cast integral with the housing, which procedure is preferable on a production basis.

When operating the device on an automobile, for instance, and with the car moving forward at some definite speed, it is desired to bring it to a stop quickly, a "power brake" effect may be accomplished by simply moving the valve-control lever to its reverse position, shown in dotted lines (Fig. 7), and accelerating the motor. Rocking a car back and forth to get it out of a "chuck hole" may be accomplished by simply throwing the control lever 32 back and forth at the proper moments, to its full forward or reverse position, with the motor somewhat accelerated according to need. While the "creep" of the car is negligible on driven rotor 7, unless idling speed is unusually high; this tendency to creep may be neutralized by placing the control lever 32 in a neutral position whereby the forward and the reverse nozzles 26 and 27 would both be partly open, thus neutralizing fluid action on driven rotor 7.

What I claim is:

1. A reversible fluid coupling comprising a housing having parallel end walls and an elliptical side wall, a pump rotor rotatably disposed in the lower portion of said housing and journalled in said end walls, a plurality of radially disposed blades on said pump rotor, a driven rotor rotatably disposed in the upper portion of said housing in parallel relation to said pump rotor and journalled in said end walls, a plurality of radially disposed blades on said driven rotor one face of each blade being concave and the opposite face convex, the concave faces all facing in the same circumferential direction, a power take off shaft secured to said driven rotor and extending through one end wall, a drive shaft coaxial with said power take off shaft and journalled in the other end wall, driving connections between said drive shaft and said pump rotor, a nozzle structure secured to said side wall and disposed substantially midway between said rotors, said nozzle structure including a first outlet nozzle disposed to direct fluid flowing therethrough against said concave faces, a second outlet nozzle disposed to direct fluid flowing therethrough against said convex faces, a valve in said nozzle structure for selectively directing fluid through said first nozzle or said second nozzle, an arcuate segmntal baffle surrounding a portion of the circumference of said driven rotor, said baffle being mounted for limited pivotal movement around the axis of said driven rotor from one extreme position to a diametrically opposite second extreme position between said rotors, there being frictional engagement between said baffle and said driven rotor whereby said limited pivotal movement is accomplished and whereby upon rotation of said pump rotor fluid will flow through said valve and said first outlet nozzle and impinge on the concave faces of said driven rotor blades causing rotation thereof in one direction and whereby upon movement of said valve fluid will flow through said second outlet nozzle and impinge on the convex faces of said driven rotor blades causing rotation thereof in a reverse direction thus simultaneously moving said baffle to said second extreme position whereby impingement of fluid on said concave faces is prevented.

2. A reversible fluid coupling comprising a housing having parallel end walls and an elliptical side wall, a pump rotor rotatably disposed in said housing and journalled in said end walls, a plurality of radially disposed blades on said pump rotor, a driven rotor rotatably disposed in said housing in parallel relation to said pump rotor and journalled in said end walls, a plurality of radially disposed blades on said driven rotor one face of each blade being concave and the opposite face convex, the concave faces all facing in the same circumferential direction, a power take off shaft secured to said driven rotor and extending through one end wall, a drive shaft coaxial with said power take off shaft and journalled in the other end wall, driving connections between said drive shaft and said pump rotor, a nozzle structure on said side wall disposed substantially midway between said rotors, said nozzle structure including a first outlet nozzle disposed to direct fluid flowing therethrough against said concave faces, a second outlet nozzle disposed to direct fluid flowing therethrough against said convex faces, a valve in said nozzle structure for selectively directing fluid through said first nozzle or said second nozzle, an arcuate segmental baffle surrounding a portion of the circumference of said driven rotor, said baffle being mounted for limited pivotal movement around the axis of said driven rotor from one extreme position to a diametrically opposite extreme position between said rotors there being frictional engagement between said baffle and said driven rotor whereby upon rotation of said pump rotor fluid will flow through said valve and said first outlet nozzle and impinge on the concave faces of said driven rotor blades causing rotation thereof in one direction and whereby upon movement of said valve fluid will flow through said second outlet nozzle and impinge on the convex faces of said driven rotor blades causing rotation thereof in a reverse direction thus simultaneously moving said baffle to said second extreme position whereby impingement of fluid on said concave faces is prevented.

3. A reversible fluid coupling comprising a housing having parallel end walls and an elliptical side wall, a pump rotor rotatably disposed in said housing and journalled in said end walls, a driven rotor rotatably disposed in said housing in parallel relation to said pump rotor and journalled in said end walls, a plurality of radially disposed blades on said driven rotor one face of each blade being concave and the opposite face convex, the concave faces all facing in the same circumferential direction, a power take off shaft secured to said driven rotor and extending through one end wall, means for driving said pump rotor, a nozzle structure on said side wall disposed substantially midway between said rotors, said nozzle structure including a first outlet nozzle disposed to direct fluid flowing therethrough against said concave faces, a second outlet nozzle disposed to direct fluid flowing therethrough against said convex faces, a valve in said nozzle structure for selectively directing fluid through said first nozzle or said second nozzle, an arcuate segmental baffle surrounding a portion of the circumference of said driven rotor, said baffle being mounted for limited pivotal movement around the axis of said driven rotor from one extreme position to a diametrically opposite second extreme position between said rotors there being frictional engagement between said baffle and said driven rotor whereby upon rotation of said pump rotor fluid will flow through said valve and said first outlet nozzle and impinge on the concave faces of said driven rotor blades causing rotation thereof in one direction and whereby upon movement of said valve fluid will flow through said second outlet nozzle and impinge on the convex faces of said driven rotor blades causing rotation thereof in a reverse direction thus simultaneously moving said baffle to said second extreme position whereby impingement of fluid on said concave faces is prevented.

4. A reversible fluid coupling comprising a housing having parallel end walls and a side wall, a pump rotor rotatably disposed in said housing and journalled in said end walls, a driven rotor rotatably disposed in said housing in parallel relation to said pump rotor and journalled in said end walls, a plurality of blades on said driven rotor one face of each blade being concave and the opposite face convex, the concave faces all facing in the same circumferential direction, a power take off shaft secured to said driven rotor and extending through one end wall, means for driving said pump rotor, a nozzle structure on said side wall including a first outlet nozzle disposed to direct fluid flowing therethrough against said concave faces, a second outlet nozzle disposed to direct fluid flowing therethrough against said convex faces, a valve in said nozzle structure for selectively directing fluid through said first nozzle or said second nozzle, an arcuate segmental baffle surrounding a portion of the circumference of said driven rotor said baffle being mounted for limited pivotal movement around the axis of said driven rotor from one extreme position to a diametrically opposite second extreme position between said rotors there being frictional engagement between said baffle and said driven rotor whereby upon rotation of said pump rotor fluid will flow through said valve and said first outlet nozzle and impinge on the concave faces of said driven rotor blades causing rotation thereof in one direction and whereby upon movement of said valve fluid will flow through said second outlet nozzle and impinge on the convex faces of said driven rotor blades causing rotation thereof in a reverse direction thus simultaneously moving said baffle to said second extreme position whereby impingement of fluid on said concave faces is prevented.

5. A reversible fluid coupling comprising a housing having end walls and a side wall, a pump rotor rotatably disposed in said housing and journalled in said end walls, a driven rotor rotatably disposed in said housing in parallel relation to said pump rotor and journalled in said end walls, a plurality of blades on said driven rotor, a power take off shaft secured to said driven rotor and extending through one end wall, means for driving said pump rotor, a nozzle structure on said side wall including a first outlet nozzle disposed to direct fluid flowing therethrough against one face of said blades, a second outlet nozzle disposed to direct fluid flowing therethrough against the opposite face of said blades, a valve in said nozzle structure for selectively directing fluid through said first nozzle or said second nozzle, an arcuate segmental baffle surrounding a portion of the circumference of said driven rotor, said baffle being mounted for limited pivotal movement around the axis of said driven rotor from one extreme position to a diametrically opposite second extreme position between said rotors there being frictional engagement between said baffle and said driven rotor whereby upon rotation of said pump rotor fluid will flow through said valve and said first outlet nozzle and impinge on one face of said blades causing rotation thereof in one direction and whereby upon movement of said valve fluid will flow through said second outlet nozzle and impinge on the opposite face of said blades causing rotation thereof in a reverse direction thus simultaneously moving said baffle to said second extreme position whereby impingement of fluid on said first mentioned faces is prevented.

6. A reversible fluid coupling comprising a housing having end walls and a side wall, a pump rotor rotatably disposed in said housing, a driven rotor rotatably disposed in said housing in parallel relation to said pump rotor, a plurality of blades on said driven rotor, a power take off shaft secured to said driven rotor, means for driving said pump rotor, means for selectively directing fluid from said pump rotor to one face or the opposite face of said blades causing rotation thereof in one direction or the other and means associated with said driven rotor and frictionally operable thereby so as to be automatically movable from one extreme position to a second extreme position said last named means when occupying said second extreme position preventing impingement of fluid upon one face of said blades.

7. A structure as defined in claim 4 in which said valve may be set to a neutral position thus directing fluid through both said first and said second nozzles whereby said fluid will impinge with equal force on both said concave and said convex faces thus maintaining said driven rotor stationary.

8. A structure as defined in claim 4 wherein tube means are provided exteriorly of said housing in communication with said housing through which fluid may flow for dissipating heat generated within said housing.

HARLIE O. PUTT.

REFERENCES CITED

The following references are of record in the file of this patent:

UNITED STATES PATENTS

| Number | Name | Date |
|---|---|---|
| 472,199 | Seabury | Apr. 5, 1892 |
| 717,308 | Wiechmann | Dec. 30, 1902 |
| 1,141,812 | Michell et al. | June 1, 1915 |
| 1,269,338 | Tourreil | June 11, 1918 |
| 1,451,997 | Michell | Apr. 17, 1923 |
| 1,551,055 | Rieseler | Aug. 25, 1925 |

FOREIGN PATENTS

| Number | Country | Date |
|---|---|---|
| 26,639 | Great Britain | Nov. 16, 1910 |
| 231,763 | Great Britain | Apr. 9, 1925 |